US012803921B2

(12) United States Patent
Luo

(10) Patent No.: US 12,803,921 B2
(45) Date of Patent: Nov. 17, 2026

(54) DATA PROCESSING METHOD, NETWORK-SIDE DEVICE AND ELECTRONIC DEVICE

(71) Applicant: VIVO MOBILE COMMUNICATION CO., LTD., Dongguan (CN)

(72) Inventor: Kai Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 301 days.

(21) Appl. No.: 18/673,837

(22) Filed: May 24, 2024

(65) Prior Publication Data

US 2024/0314083 A1 Sep. 19, 2024

Related U.S. Application Data

(63) Continuation of application No. PCT/CN2022/133499, filed on Nov. 22, 2022.

(30) Foreign Application Priority Data

Nov. 29, 2021 (CN) ........................ 202111434632.5

(51) Int. Cl.
*H04L 47/2475* (2022.01)
*H04L 65/1059* (2022.01)
(Continued)

(52) U.S. Cl.
CPC ...... *H04L 47/2475* (2013.01); *H04L 65/1059* (2013.01); *H04L 65/80* (2013.01);
(Continued)

(58) Field of Classification Search
CPC . H04L 47/2475; H04L 65/1059; H04L 65/80; H04W 4/06; H04W 4/12;
(Continued)

(56) References Cited

U.S. PATENT DOCUMENTS

| | | | |
|---|---|---|---|
| 11,184,809 | B2 | 11/2021 | Sun et al. |
| 2011/0310804 | A1 | 12/2011 | Beygzadeh |

(Continued)

FOREIGN PATENT DOCUMENTS

| | | | |
|---|---|---|---|
| CN | 105653945 | A | 6/2016 |
| CN | 105827683 | A | 8/2016 |

(Continued)

OTHER PUBLICATIONS

ETSI, "5G; System architecture for the 5G System (5GS) (3GPP TS 23.501 version 16.9.0 Release 16)", Jul. 2021, p. 135 and section 5.7.1.2, ETSI TS 123 501 V16.9.0.

*Primary Examiner* — Michael A Keller
*Assistant Examiner* — Chhian (Amy) Ling
(74) *Attorney, Agent, or Firm* — The Webb Law Firm

(57) ABSTRACT

A data processing method includes obtaining a target service list of a target electronic device before the network-side device transmits target application service data, where the target service list includes at least one QoS identifier, each QoS identifier is used to indicate QoS of one piece of application service data, and the application service data corresponding to the at least one QoS identifier is application service data that the target electronic device in an idle state does not expect to receive; and processing the target application service data based on the target service list and a QoS identifier of the target application service data.

12 Claims, 7 Drawing Sheets

(51) Int. Cl.

| | |
|---|---|
| ***H04L 65/80*** | (2022.01) |
| ***H04W 4/06*** | (2009.01) |
| ***H04W 4/12*** | (2009.01) |
| ***H04W 28/02*** | (2009.01) |
| ***H04W 76/10*** | (2018.01) |
| ***H04W 76/11*** | (2018.01) |
| ***H04W 76/12*** | (2018.01) |
| *H04W 68/00* | (2009.01) |
| *H04W 76/27* | (2018.01) |

(52) U.S. Cl.
CPC ............... *H04W 4/06* (2013.01); *H04W 4/12* (2013.01); *H04W 28/0215* (2013.01); *H04W 28/0268* (2013.01); *H04W 76/10* (2018.02); *H04W 76/11* (2018.02); *H04W 76/12* (2018.02); *H04W 68/005* (2013.01); *H04W 76/27* (2018.02)

(58) Field of Classification Search
CPC ......... H04W 28/0215; H04W 28/0268; H04W 76/10; H04W 76/11; H04W 76/12; H04W 68/005; H04W 76/27
See application file for complete search history.

(56) References Cited

U.S. PATENT DOCUMENTS

| | | | | |
|---|---|---|---|---|
| 2019/0174360 | A1* | 6/2019 | Pang ..................... | H04W 28/16 |
| 2020/0229055 | A1* | 7/2020 | Chien ................... | H04W 76/22 |
| 2021/0176366 | A1 | 6/2021 | Garcia Azorero | |
| 2022/0167320 | A1 | 5/2022 | Lee et al. | |
| 2022/0191778 | A1* | 6/2022 | Kumar .................. | H04W 48/18 |
| 2022/0264290 | A1* | 8/2022 | Nair ...................... | H04W 12/02 |

FOREIGN PATENT DOCUMENTS

| | | | | |
|---|---|---|---|---|
| CN | 106254213 | A | 12/2016 | |
| CN | 107734076 | A | 2/2018 | |
| CN | 109413157 | A | 3/2019 | |
| CN | 112567684 | A | 3/2021 | |
| CN | 113692769 | A | 11/2021 | |
| CN | 114173291 | A | 3/2022 | |
| WO | 2019081027 | A1 | 5/2019 | |
| WO | 2019095781 | A1 | 5/2019 | |
| WO | 2020068049 | A1 | 4/2020 | |
| WO | WO-2020209620 | A1 * | 10/2020 | ............ H04W 68/02 |

* cited by examiner

DATA PROCESSING METHOD, NETWORK-SIDE DEVICE AND ELECTRONIC DEVICE

CROSS-REFERENCE TO RELATED APPLICATIONS

This application is a Bypass Continuation application of International Patent Application No. PCT/CN2022/133499 filed on Nov. 22, 2022, and claims priority to Chinese Patent Application No. 202111434632.5 filed Nov. 29, 2021, the disclosures of which are hereby incorporated by reference in their entireties.

BACKGROUND OF THE INVENTION

Field of the Invention

This application pertains to the field of communication technologies, and particularly relates to a data processing method, a network-side device and an electronic device.

Description of Related Art

Currently, with the increase in the number of applications on electronic devices, push messages from applications on electronic devices are also gradually increasing. Typically, for push messages that users are not interested in, users can install security applications on electronic devices to intercept such push messages.

SUMMARY OF THE INVENTION

According to a first aspect, an embodiment of this application provides a data processing method applied to a network-side device. The data processing method includes: obtaining a target service list of a target electronic device before the network-side device transmits target application service data, where the target service list includes at least one quality of service (QOS) identifier, each QoS identifier is used to indicate QoS of one piece of application service data, and the application service data corresponding to the at least one QoS identifier is application service data that the electronic device in an idle state does not expect to receive; and processing the target application service data based on the target service list and a QoS identifier of the target application service data.

According to a second aspect, an embodiment of this application provides a data processing method applied to an electronic device. The data processing method includes: in a case that the electronic device is in an idle state, transmitting a target service list to a network-side device, where the target service list includes at least one QoS identifier, each QoS identifier is used to indicate QoS of one piece of application service data, and the application service data corresponding to the at least one QoS identifier is application service data that the electronic device does not expect to receive; where the at least one QoS identifier is used by the network-side device to process target application service data to be transmitted.

According to a third aspect, an embodiment of this application provides a data processing apparatus applied to a network-side device, where the data processing apparatus includes an obtaining module and a processing module, where the obtaining module is configured to obtain a target service list of a target electronic device before the network-side device transmits target application service data, where the target service list includes at least one QoS identifier, each QoS identifier is used to indicate QoS of one piece of application service data, and the application service data corresponding to the at least one QoS identifier is application service data that the electronic device in an idle state does not expect to receive; and the processing module is configured to process the target application service data based on the target service list and a QoS identifier of the target application service data.

According to a fourth aspect, an embodiment of this application provides a data processing apparatus applied to an electronic device, where the data processing apparatus includes a transmitting module, where the transmitting module is configured to: in a case that the electronic device is in an idle state, transmit a target service list to a network-side device, where the target service list includes at least one QoS identifier, each QoS identifier is used to indicate QoS of one piece of application service data, and the application service data corresponding to the at least one QoS identifier is application service data whose paging the electronic device does not expect to receive; where the at least one QoS identifier is used by the network-side device to process target application service data to be transmitted.

According to a fifth aspect, an embodiment of this application provides a network-side device, where the network-side device includes a processor, a memory, and a program or instructions stored in the memory and executable on the processor, and when the program or instructions are executed by the processor, the steps of the method according to the first aspect are implemented.

According to a sixth aspect, an embodiment of this application provides an electronic device, where the electronic device includes a processor, a memory, and a program or instructions stored in the memory and executable on the processor, and when the program or instructions are executed by the processor, the steps of the method according to the second aspect are implemented.

According to a seventh aspect, an embodiment of this application provides a non-transitory readable storage medium, where a program or instructions are stored in the non-transitory readable storage medium, and when the program or the instructions are executed by a processor, the steps of the method according to the first aspect are implemented, or the steps of the method according to the second aspect are implemented.

According to an eighth aspect, an embodiment of this application provides a chip. The chip includes a processor and a communication interface. The communication interface is coupled to the processor. The processor is configured to run a program or instructions to implement the method according to the first aspect or implement the method according to the second aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It is worth noting that the technology described in the embodiments of this application is not limited to long term evolution (LTE) or LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for illustration purposes, NR terms are used in most of the following descriptions, and these technologies may also be applied to other applications than the NR system application, for example, the 6th generation (6G) communication system.

Figure 1:
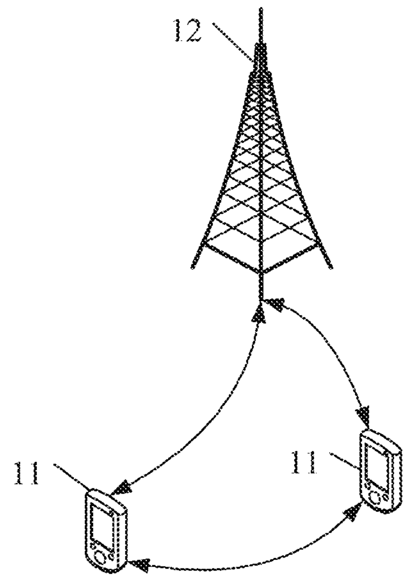
FIG. 1 is a block diagram of a wireless communication system according to an embodiment of this application.

FIG. 1 is a block diagram of a wireless communication system to which the embodiments of this application are applicable. The wireless communication system includes an electronic device 11 and a network-side device 12. The electronic device 11 may also be a terminal device or user equipment (UE). The electronic device 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a smart watch, a wrist band, earphones, glasses, and the like. It should be noted that a type of the electronic device 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that the base station in the NR system is only used as an example in the embodiments of this application, but a type of the base station is not limited.

The following describes a data processing method provided in the embodiments of this application by using some embodiments and application scenarios thereof with reference to the accompanying drawings.

At present, QoS decision-making in mobile communication primarily employs the following mechanisms: negotiation and compromise, arbitrary decision-making, and implementation of a single decisive vote after a certain conclusion. The 2nd generation mobile communication technology (2G) and the 3rd generation mobile communication technology (3G) use a negotiation and compromise mechanism, for example, the electronic device and the network side negotiate with each other. The 4th generation mobile communication technology (4G) and the 5th generation mobile communication technology (5G) use the form of arbitrary decision-making and implementation of a single decisive vote after a certain conclusion. For example, this is controlled by the network-side, plus restrictions imposed by mobility and session management network elements. Since the QoS decision-making in the mobile communication technology is mainly determined by the network-side, demands of users cannot be well satisfied. Usually, a user can install a security application on the electronic device to block these push messages. However, other applications (for example, information flow notification applications) on the electronic device have the same priority as the security application in processing such push messages. As a result, the electronic device will still receive such push messages. In addition, in the mobile communication network, various application services (Over The TOP, OTT) (for example, Internet TV) provided to the user by the Internet occupy the vast majority of the network resources of the electronic device. Consequently, the electronic device has a low efficiency of push message interception and a low utilization rate of mobile communication network resources.

In an embodiment of this application, the network-side device can obtain a target service list before transmitting target application service data, where the target service list includes at least one QoS identifier, and each QoS identifier indicates QoS of one piece of application service data, thereby enabling the network-side device to process the target application service data according to the application service data corresponding to each Qos identifier. In the solution of this application, the network-side device can first determine whether the QoS identifier of the application service data is in the target service list when the network-side device needs to transmit the application service data, that is, determine whether the application service data is data that an electronic device in an idle state needs to receive by paging. In this way, the network-side device determines whether to transmit the application service data based on the determining result instead of directly transmitting the application service data to the electronic device, avoiding transmitting a push message that the user is not interested in to the electronic device. This improves the flexibility of the network-side device in handling push messages, thereby improving the efficiency of message interception by the electronic device.

Figure 2:
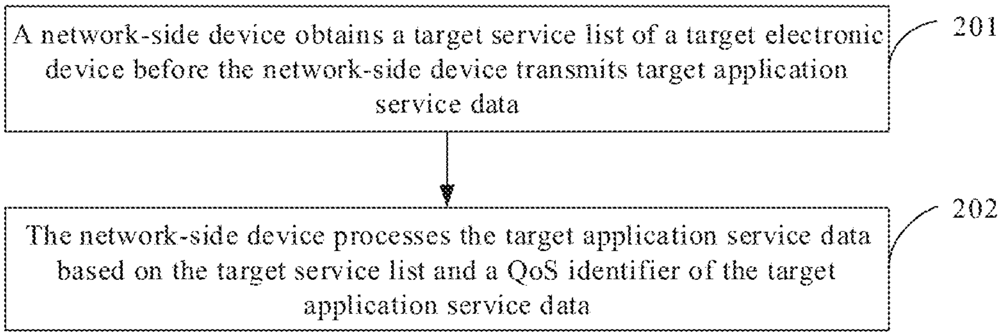
FIG. 2 is a first flowchart of a data processing method according to an embodiment of this application.

An embodiment of this application provides a data processing method applied to a network-side device. FIG. 2 is a flowchart of a data processing method according to an embodiment of this application. As shown in FIG. 2, the data processing method provided in this embodiment of this application may include the following steps 201 and 202.

Step 201: A network-side device obtains a target service list of a target electronic device before the network-side device transmits target application service data.

In this embodiment of this application, the target service list includes at least one QoS identifier, each QoS identifier is used to indicate QoS of one piece of application service data, and the application service data corresponding to the at least one QoS identifier is application service data that an electronic device in an idle state does not expect to receive.

It can be understood that the network-side device can receive a service list transmitted by at least one electronic device, such that the network-side device can process application service data (that is, determine whether to transmit the application service data to a target electronic device) based on a target service list corresponding to each electronic device (that is, the target electronic device).

In this embodiment of this application, when the network-side device needs to transmit the application service data (for example, the target application service data) to the electronic device in the idle state, the network-side device can obtain the target service list and determine whether the QoS identifier corresponding to the application service data is in the target service list, so as to determine, based on the determining result, whether to transmit the application service data to the electronic device in the idle state.

It should be noted that the network-side device can initiate a paging process to the electronic device in the idle state to enable the electronic device to establish a wireless connection (that is, to be in a connected state), such that the network-side device then transmits the application service data to the electronic device in the connected state.

Optionally, in this embodiment of this application, the foregoing target service list may be pre-stored on the network-side device; alternatively, the foregoing target service list may be transmitted by the electronic device to the network-side device, that is, the network-side device may transmit a request message to the electronic device to request for a QoS identifier, so that the electronic device can transmit at least one QoS identifier in the form of a list to the network-side device.

It should be noted that the application service data for which the electronic device in the idle state does not perform paging can be understood as follows: for the electronic device in the idle state, the application service data corresponding to the at least one QoS identifier is the data that the electronic device does not expect to receive. In other words, the network-side device does not initiate a paging process to the electronic device in the idle state, such that the electronic device in the idle state does not perform paging.

Step 202: The network-side device processes the target application service data based on the target service list and a QoS identifier of the target application service data.

In this embodiment of this application, the network-side device can determine whether the QoS identifier of the target application service data is in the target service list so as to process the target application service data accordingly based on the determining result. It can be understood that in a case that the target service list includes the QoS identifier of the target application service data, the network-side device does not transmit the target application service data; or in a case that the target service list does not include the QoS identifier of the target application service data, the network-side device transmits the target application service data.

Optionally, in this embodiment of this application, step 202 may be implemented in the following step 202*a*.

Step 202*a*: In a case of detecting that a QoS identifier report function is enabled by the target electronic device, the network-side device processes the target application service data based on the target service list and the QoS identifier of the target application service data.

Optionally, in this embodiment of this application, the network-side device may transmit a request message to the electronic device to request to obtain a piece of indication information about whether the QoS identifier report function is enabled by the electronic device; and the electronic device may transmit indication information to the network-side device to indicate to the network-side device that the QoS identifier report function is enabled by the electronic device.

In this embodiment of this application, the flexibility of the network-side device in processing the application service data is improved because the network-side device can detect whether the QoS identifier report function is enabled by the electronic device so that the network-side device can determine, based on the QoS identifier report function, whether to process the target application service data.

Optionally, in this embodiment of this application, the foregoing step 202 may be implemented in the following step 202*b* or 202*c*.

Step 202*b*: In a case that the target service list includes the QoS identifier of the target application service data, the network-side device caches or deletes the target application service data.

It can be understood that in a case that the target service list includes the QoS identifier of the target application service data, the network-side device can be informed that the electronic device does not expect to receive the target application service data, so that instead of transmitting the target application service data, the network-side device may either cache the target application service data in the core network device or the base station according to the communication network standard, or directly discard the target application service data.

Optionally, in this embodiment of this application, after the foregoing step 202*a*, the data processing method provided in this embodiment of this application further includes the following step 301.

Step 301: In a case of detecting that the target electronic device has established an RRC connection, the network-side device transmits a piece of first application service data to the target electronic device.

In this embodiment of this application, the foregoing first application service data is the application service data corresponding to the at least one QoS identifier, where the first application service data includes the target application service data or the first application service data does not include the target application service data.

In this embodiment of this application, in a case that the network-side device detects that the electronic device has actively established an RRC connection, the network-side device can transmit the first application service data to the electronic device. In one scenario, in a case that the network-side device has performed caching of the target application service data, the network-side device may transmit to the electronic device both the application service data cached in the network-side device and other application service data which are to be transmitted after the electronic device has actively established the RRC connection. In another scenario, in a case that the network-side device has performed deletion of the target application service data, the network-side device may transmit to the electronic device other application service data which are to be transmitted after the electronic device has actively established the RRC connection.

In this embodiment of this application, in a case that the target electronic device has actively established the RRC connection, the network-side device may transmit the first application service data to the target electronic device, that is, whether to receive the application service data can be determined by the electronic device. This improves the flexibility of the network-side device in processing the application service data.

Step 202*c*: In a case that the target service list does not include the QoS identifier of the target application service data, the network-side device transmits the target application service data to the target electronic device.

It can be understood that in a case that the target service list does not include the QoS identifier of the target application service data, the network-side device can be informed that the target electronic device expects to receive the target application service data, then the network-side device may transmit the target application service data to the target electronic device.

In this embodiment of this application, the network-side device can process the target application service data differently based on the presence or absence of the QoS identifier of the target application service data in the target service list, thereby preventing the electronic device from receiving the application service data that the user is not interested in, improving the flexibility of the network-side device in processing the application service data, and improving the resource utilization rate of the network-side device.

Optionally, in this embodiment of this application, the foregoing step 202*c* may be implemented in the following step 202*c*1.

Step 202*cl*: In a case that the target service list does not include the QoS identifier of the target application service data, the network-side device initiates a paging process to the target electronic device and in a case that the target electronic device has established an RRC connection, transmits the target application service data to the target electronic device.

In this embodiment of this application, the network-side device can transmit a paging message to the electronic device to instruct the electronic device to perform the paging process; the electronic device can transmit a radio resource control (RRC) connection establishment request message to the network-side device in accordance with the instructions of the paging message, so that the network-side device can transmit an RRC connection establishment response message to enable the electronic device to establish an RRC connection, that is, to switch from an RRC idle state (hereinafter referred to as the idle state) to an RRC connected state (hereinafter referred to as the connected state). Then, the network-side device transmits the target application service data to the electronic device in the connected state, so that the electronic device in the connected state can receive the target application service data transmitted by the network-side device.

In the data processing method provided in this embodiment of this application, in a case that the network-side device is about to transmit the target application service data, the network-side device can process the target application service data accordingly based on the presence or absence of the QoS identifier of the target application service data in the target service list. The network-side device can first determine whether the QoS identifier of the application service data is in the target service list when the network-side device needs to transmit the application service data, that is, determine whether the application service data is data that the electronic device in the idle state needs to receive by paging. In this way, the network-side device determines whether to transmit the application service data based on the determining result instead of directly transmitting the application service data to the electronic device, avoiding transmitting a push message that the user is not interested in to the electronic device. This improves the flexibility of the network-side device in handling push messages, thereby improving the efficiency of message interception by the electronic device.

This embodiment of the present application enables a one-click implementation of the "Do Not Disturb" capability for a terminal. However, the normal reception of data messages related to mobile communication call services and other essential application services is not affected. With a switch for this capability added on a terminal, the terminal is endowed with the ability to negotiate QoS in the PS domain of mobile communication and with the network side. Simultaneously, the network side employs differential paging strategies for various application service data streams transmitted to this terminal based on the application service tags reported by the electronic device. While enhancing the perceptual experience of the electronic device in using mobile communication services, this effectively improves the overall resource utilization efficiency of the mobile communication network. This also enhances the management capabilities of the electronic device and the network side for communication service data streams.

Figure 3:
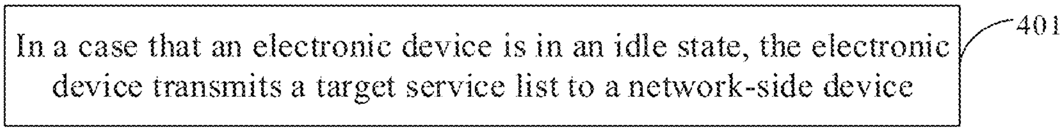
FIG. 3 is a second flowchart of a data processing method according to an embodiment of this application.

An embodiment of this application provides a data processing method, where the method is applied to an electronic device. FIG. 3 is a flowchart of a data processing method according to an embodiment of this application. As shown in FIG. 3, the data processing method provided in this embodiment of this application may include the following step 401.

Step 401: In a case that an electronic device is in an idle state, the electronic device transmits a target service list to a network-side device.

In this embodiment of this application, the foregoing target service list includes at least one QoS identifier, each QoS identifier is used to indicate QoS of one piece of application service data, and the application service data corresponding to the at least one QoS identifier is application service data for which the electronic device does not perform paging; where the at least one QoS identifier is used by the network-side device to process target application service data to be transmitted.

In this embodiment of this application, the electronic device can categorize the communication service data streams and identify the QoS for different application service data. Therefore, based on the pre-defined QoS identifier, for the application service data existing in the target service list, the network-side device does not perform paging to the electronic device when the electronic device enters an idle state.

Optionally, in this embodiment of this application, the electronic device may transmit the target service list to the network-side device through a terminal network registration and a service request process, transmit the target service list to the network-side device during a communication process of the electronic device (for example, when the electronic device triggers a modification of the user context), or transmit the target service list to the network-side device after the electronic completes the modification action.

Optionally, in this embodiment of this application, the at least one QoS identifier in the foregoing target service list may be user-selected, less frequently used in history, or determined by the electronic device based on an application (for example, a same browser application).

Figure 4:
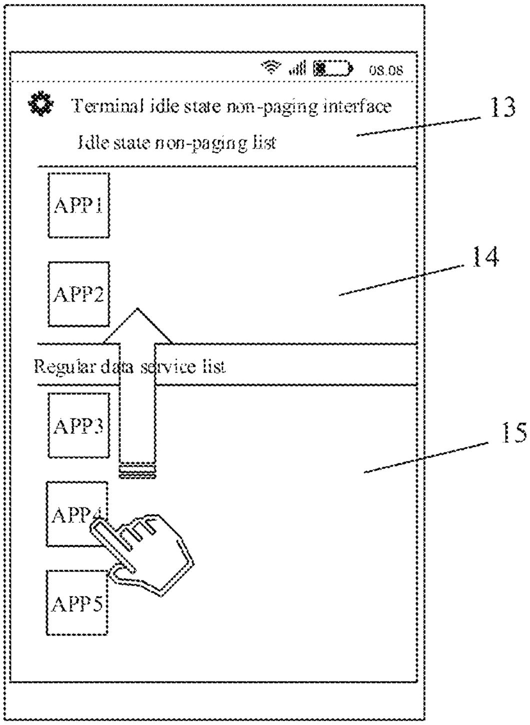
FIG. 4 is a first schematic diagram of an instance of an interface of a mobile phone according to an embodiment of this application.

In an example in which an electronic device is a mobile phone, as shown in FIG. 4, the mobile phone can display an idle state non-paging application list 14 and a regular data service application list 15 in a terminal idle state non-paging interface 13. The idle state non-paging application list 14 includes application 1 (represented by APP1 in FIG. 4) and application 2 (represented by APP2 in FIG. 4), while the regular data service application list 15 includes application 3 (represented by APP3 in FIG. 4), application 4 (represented by APP4 in FIG. 4), and application 5 (represented by APP5 in FIG. 4). Users can move application 4 (represented by APP4 in FIG. 4) from the regular data service application list 15 to the idle state non-paging application list 14 by dragging and dropping, so that when the application service data demand for application 4 is transmitted to the mobile phone, the network-side device can process the application service data for application 4 based on a QoS identifier of application 4 in the idle state non-paging application list 14.

Optionally, in this embodiment of this application, the user may enable the QoS identifier report function in the electronic device by an upload input, so that the network-side device can process the application service data corresponding to the QoS identifier.

Optionally, in this embodiment of this application, the foregoing upload input may be a click input, a slide input, a preset track input, or a long-press input, and the like by the user on the terminal idle state non-paging switch control in the application setting interface. This may be determined based on an actual use requirement, and is not limited in this embodiment of this application.

Figure 5:
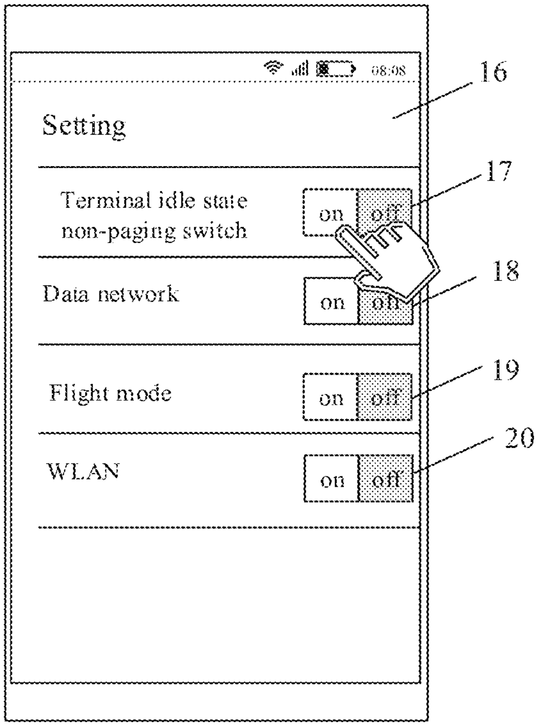
FIG. 5 is a second schematic diagram of an instance of an interface of a mobile phone according to an embodiment of this application.

For example, as shown in FIG. 5, a terminal idle state non-paging switch control 17, a data network control 18, a flight mode control 19, and a WLAN control 20 are displayed in the application setting interface 16 of the mobile phone. The user may make a click input to the terminal idle state non-paging switch control 17, so that the electronic device enables, based on the click input of the user to the terminal idle state non-paging switch control 17, the function of the electronic device of identifying the QoS of different application service data and reporting the identifiers to the network-side device.

In the data processing method provided in this embodiment of this application, when the electronic device is in the idle state, the electronic device can transmit the target service list to the network-side device, and the target service list includes at least one QoS identifier. The at least one QoS identifier is used by the network-side device to process the target application service data to be transmitted, that is, the network-side device can determine, based on the target service list transmitted by the electronic device, whether the application service data is data that the electronic device in the idle state needs to receive by paging. In this way, the network-side device determines whether to transmit the application service data based on the determining result instead of directly transmitting the application service data to the electronic device, preventing the electronic device from receiving a push message that the user is not interested in. This improves the efficiency of message interception by the electronic device.

Optionally, in this embodiment of this application, after the foregoing step 401, the data processing method provided in this embodiment of this application further includes the following step 501.

Step 501: In a case that the target service list does not include the QoS identifier of the target application service data, the electronic device receives the target application service data transmitted by the network-side device.

In this embodiment of this application, in a case that the network-side device detects that the target service list does not include the QoS identifier of the target service data, the network-side device may transmit the target service data directly to the electronic device, thereby enabling the electronic device to receive the target application service data transmitted by the network-side device.

In this embodiment of this application, in a case that the target service list does not include the QoS identifier of the target application service data, the electronic device can directly receive the target application service data transmitted by the network-side device, that is, the electronic device can normally receive the data messages related to mobile communication call services and other essential application services, which enhances the efficiency of resource utilization of the electronic device.

Optionally, in this embodiment of this application, after the foregoing step 401, the data processing method provided in this embodiment of this application further includes the following step 601.

Step 601. The electronic device establishes an RRC connection and receives a piece of first application service data transmitted by the network-side device.

In this embodiment of this application, the foregoing first application service data is the application service data corresponding to the at least one QoS identifier, where the first application service data includes the target application service data or the first application service data does not include the target application service data.

In this embodiment of this application, the electronic device can actively establish an RRC connection and receive, after the electronic device has established the RRC connection with the network-side device, the first application service data transmitted by the network-side device.

In this embodiment of this application, the electronic device can actively establish the RRC connection with the network-side device and then receive the first application service data transmitted by the network-side device, that is, the user may trigger the electronic device to actively receive the first application service data processed by the network-side device according to the need of the user. This improves the flexibility of the electronic device in receiving the application service data.

Optionally, in this embodiment of this application, after the foregoing step 401, the data processing method provided in this embodiment of this application further includes the following steps 701 and 702.

Step 701: The electronic device performs a paging process based on triggering from the network-side device to establish an RRC connection.

In this embodiment of this application, the electronic device can receive a paging message transmitted by the network-side device, transmit an RRC connection establishment request message to the network-side device, and then receive an RRC connection establishment response message transmitted by the network side, so as to establish an RRC connection with the network-side device, switching from an idle state to a connected state. As a result, the electronic device can receive the target application service data transmitted by the network-side device.

Step 702: The electronic device receives the target application service data transmitted by the network-side device.

In this embodiment of this application, the electronic device can perform a paging process based on the paging information transmitted by the network-side device so that the electronic device can establish an RRC connection with the network-side device and receive the target application service data transmitted by the network-side device. The target application service data is processed by the network-side device before transmitted to the electronic device, avoiding the situation that the Internet service in the mobile communication network occupies a vast majority of the network resources of the electronic device. This improves the resource utilization rate of the electronic device for the mobile communication network.

The data processing method provided in embodiments of this application is described in the following through an interaction embodiment (that is, an interaction process between the electronic device and the network-side device).

Figure 6:
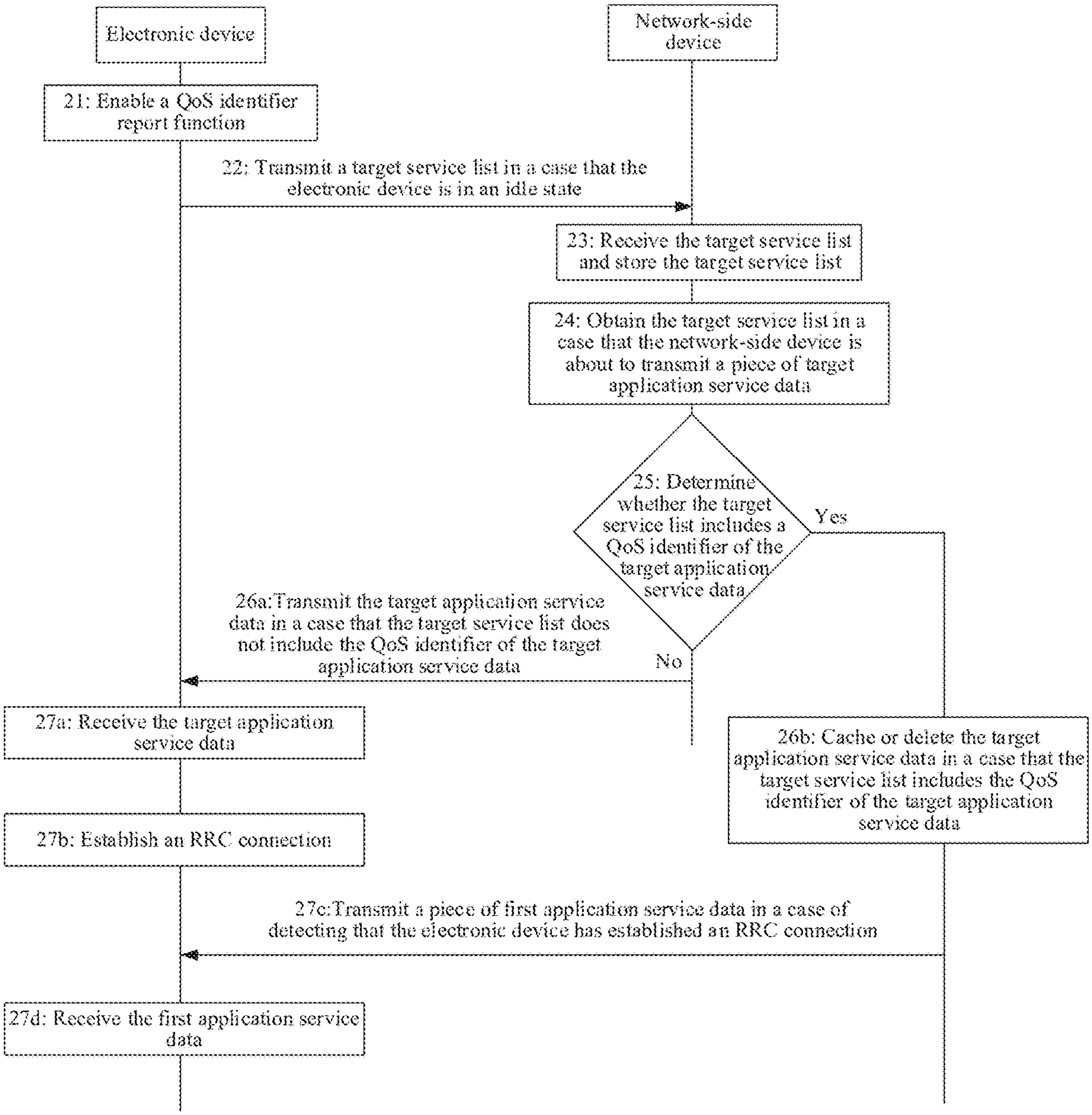
FIG. 6 is a third flowchart of a data processing method according to an embodiment of this application.

An embodiment of this application provides a data processing method. FIG. 6 is a flowchart of the data processing method according to an embodiment of this application. As shown in FIG. 6, the data processing method provided in this embodiment of this application may include the following steps 21 to 27*d*.

Step 21: An electronic device has a QoS identifier report function enabled.

Step 22: In a case that the electronic device is in an idle state, the electronic device transmits a target service list to a network-side device.

Step 23: The network-side device receives the target service list transmitted by the electronic device and stores the target service list in the network-side device.

Step 24: In a case that the network-side device is about to transmit a piece of target application service data, the network-side device obtains the target service list from the network-side device.

Step 25: The network-side device determines whether the target service list includes a QoS identifier of the target application service data.

Step 26*a*: In a case that the target service list does not include the QoS identifier of the target application service data, the network-side device transmits the target application service data to the electronic device.

Step 26*b*: In a case that the target service list includes the QoS identifier of the target application service data, the network-side device caches or deletes the target application service data.

Step 27*a*: The electronic device receives the target application service data transmitted by the network-side device.

Step 27*b*: The electronic device establishes an RRC connection.

Step 27*c*: In a case of detecting that the electronic device has established an RRC connection, the network-side device transmits a piece of first application service data to the electronic device.

Step 27*d*: The electronic device receives the first application service data transmitted by the network-side device.

It should be noted that in a case that the foregoing step 26*a* is performed, the foregoing step 27*a* is performed; and in a case that the foregoing step 26*b* is performed, the foregoing steps 27*b* to 27*d* are performed.

It should be noted that the data processing method provided in this embodiment of this application may be performed by a data processing apparatus or a control module for performing the data processing method in the data processing apparatus.

Figure 7:
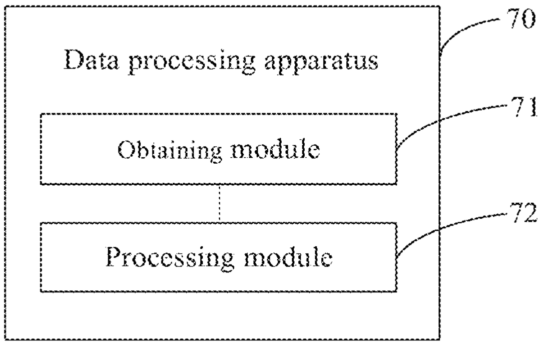
FIG. 7 is a first schematic structural diagram of a data processing apparatus according to an embodiment of this application.

FIG. 7 is a possible schematic structural diagram of a data processing apparatus applied to a network-side device according to an embodiment of this application. As shown in FIG. 7, the data processing apparatus 70 may include an obtaining module 71 and a processing module 72, where the obtaining module 71 is configured to obtain a target service list of a target electronic device before the network-side device transmits target application service data, where the target service list includes at least one QoS identifier, each QoS identifier is used to indicate QoS of one piece of application service data, and the application service data corresponding to the at least one QoS identifier is application service data that the target electronic device in an idle state does not expect to receive; and the processing module 72 is configured to process the target application service data based on the target service list and a QoS identifier of the target application service data.

In the data processing apparatus provided in this embodiment of this application, when the data processing apparatus needs to transmit the application service data, the data processing apparatus can first determine whether the QoS identifier of the application service data is in the target service list, that is, determine whether the application service data is data that the electronic device in the idle state needs to receive by paging. In this way, the data processing apparatus determines whether to transmit the application service data based on the determining result instead of directly transmitting the application service data to the electronic device, avoiding transmitting a push message that the user is not interested in to the electronic device. This improves the flexibility of the data processing apparatus in handling push messages, thereby improving the efficiency of message interception by the electronic device.

In a possible implementation, the foregoing processing module 72 is configured to: in a case of detecting that a QoS identifier report function is enabled by the target electronic device, process the target application service data based on the target service list and the QoS identifier of the target application service data.

In a possible implementation, the foregoing processing module is configured to: in a case that the target service list includes the QoS identifier of the target application service data, cache or delete the target application service data; or in a case that the target service list does not include the QoS identifier of the target application service data, transmit the target application service data to the target electronic device.

In one possible implementation, the foregoing data processing apparatus 70 further includes a transmitting module. The transmitting module is configured to: after the processing module 72 caches or deletes the target application service data, in a case of detecting that the target electronic device has established a radio resource control RRC connection, transmit a piece of first application service data to the target electronic device, the first application service data being the application service data corresponding to the at least one QoS identifier; where the first application service data includes the target application service data or the first application service data does not include the target application service data.

In one possible implementation, the foregoing processing module 71 is configured to initiate a paging process to the target electronic device and in a case that the target electronic device has established an RRC connection, transmit the target application service data to the target electronic device.

Figure 8:
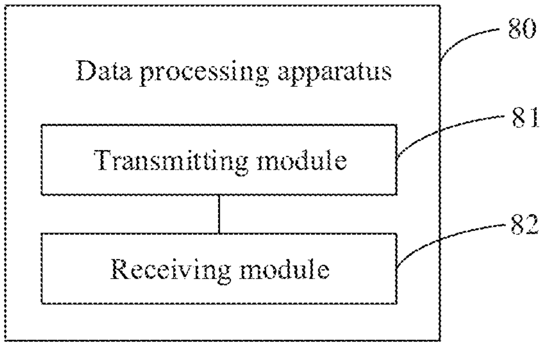
FIG. 8 is a second schematic structural diagram of a data processing apparatus according to an embodiment of this application.

FIG. 8 is a possible schematic structural diagram of a data processing apparatus applied to the electronic device according to an embodiment of this application. As shown in FIG. 8, the data processing apparatus 80 may include a transmitting module 81.

The transmitting module is configured to: in a case that the electronic device is in an idle state, transmit a target service list to a network-side device, where the target service list includes at least one QoS identifier, each QoS identifier is used to indicate QoS of one piece of application service data, and the application service data corresponding to the at least one QoS identifier is application service data for which the electronic device does not perform paging; where the at least one QoS identifier is used by the network-side device to process target application service data to be transmitted.

In the data processing apparatus provided in this embodiment of this application, the network-side device can determine, based on the target service list transmitted by the electronic device, whether the application service data is the data that the electronic device in the idle state needs to receive by paging. In this way, the network-side device determines whether to transmit the application service data based on the determining result instead of directly transmitting the application service data to the electronic device, preventing the electronic device from receiving a push message that the user is not interested in. This improves the efficiency of message interception by the electronic device.

In one possible implementation, the foregoing data processing apparatus 80 further includes a receiving module 82. The receiving module 82 is configured to: after the transmitting module 81 has transmitted a target service list to the network-side device, in a case that the target service list does not include the QoS identifier of the target application service data, receive the target application service data transmitted by the network-side device.

In one possible implementation, the foregoing data processing apparatus 80 further includes a receiving module 82. The receiving module 82 is configured to: after the transmitting module 71 has transmitted the target service list to the network-side device, establish a radio resource control RRC connection and receive a piece of first application service data transmitted by the network-side device. The first application service data is the application service data corresponding to the at least one QoS identifier, where the first application service data includes the target application service data or the first application service data does not include the target application service data.

In one possible implementation, the foregoing data processing apparatus 80 further includes a receiving module 82 and an execution module. The execution module is configured to: after the transmitting module 81 has transmitted the target service list to the network-side device, perform a paging process based on triggering from the network-side device to establish an RRC connection. The receiving module 82 is configured to receive the target application service data transmitted by the network-side device.

The data processing apparatus in this embodiment of this application may be an apparatus, or may be a component, an integrated circuit, or a chip in the electronic device. The apparatus may be a mobile electronic device or a non-mobile electronic device. For example, the mobile electronic device may be a mobile phone, a tablet computer, a notebook computer, a palmtop computer, a vehicular electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in the embodiments of this application.

The data processing apparatus in this embodiment of this application may be an apparatus having an operating system. The operating system may be an android operating system, an iOS operating system, or another possible operating system. This is not limited in the embodiments of this application.

The data processing apparatus provided in this embodiment of this application can implement the processes implemented in the foregoing method embodiment, and with the same technical effects achieved. To avoid repetition, details are not described herein again.

Figure 9:
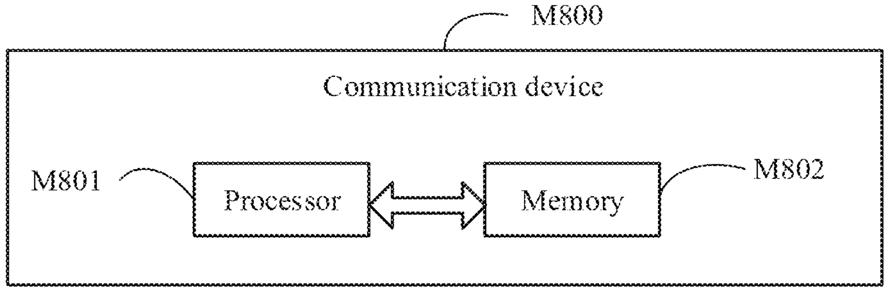
FIG. 9 is a schematic diagram of a hardware structure of a communication device according to an embodiment of this application.

Optionally, as shown in FIG. 9, an embodiment of this application further provides a communication device M800 including a processor M801, a memory M802, and a program or instructions stored in the memory M802 and executable on the processor M801. For example, in a case that the communication device M800 is an electronic device, when the program or instructions are executed by the processor M801, the processes of the foregoing method embodiment are implemented, with the same technical effects achieved. In a case that the communication device M800 is a network-side device, when the program or instructions are executed by the processor M801, the processes of the network-side device of the foregoing method embodiment are implemented, with the same technical effects achieved. To avoid repetition, details are not described herein again.

It should be noted that the electronic device in this embodiment of this application includes the foregoing mobile electronic device and non-mobile electronic device.

Figure 10:
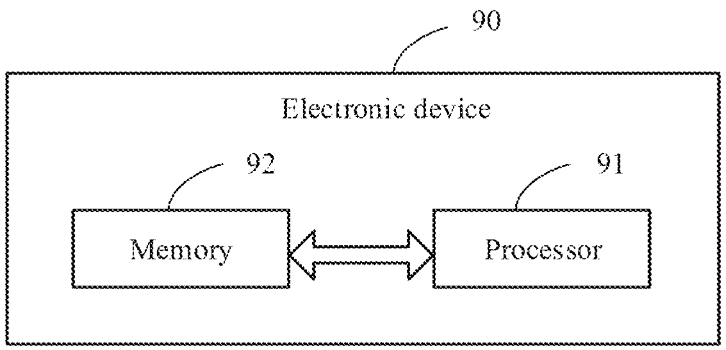
FIG. 10 is a first schematic diagram of a hardware structure of an electronic device according to an embodiment of this application.

Optionally, as shown in FIG. 10, an embodiment of this application further provides an electronic device 90 including a processor 91, a memory 92, and a program or instructions stored in the memory 92 and executable on the processor 91. When the program or instructions are executed by the processor 91, the processes of the foregoing method embodiment are implemented, with the same technical effects achieved. To avoid repetition, details are not described herein again.

It should be noted that the electronic device in this embodiment of this application includes the foregoing mobile electronic device and non-mobile electronic device.

Figure 11:
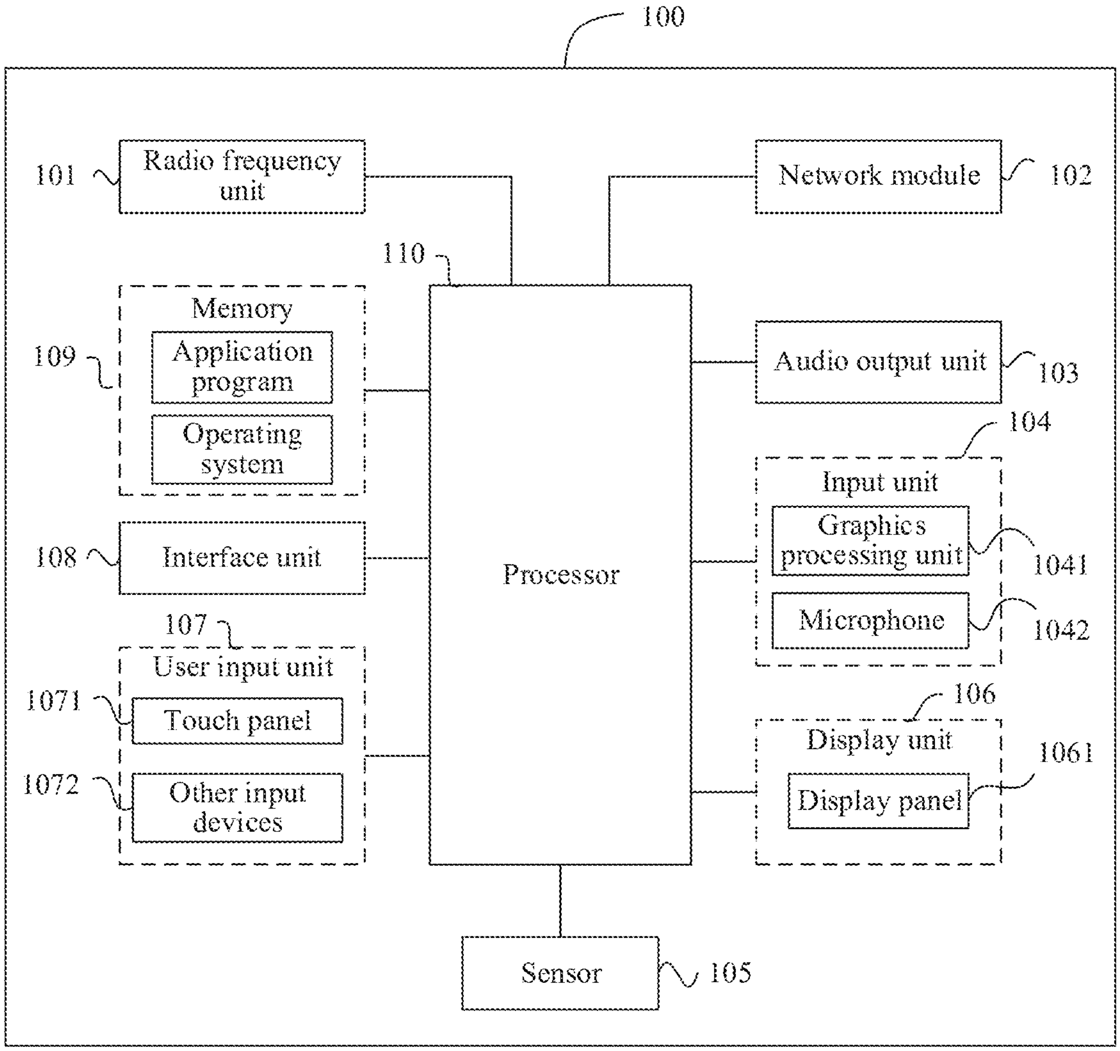
FIG. 11 is a second schematic diagram of a hardware structure of an electronic device according to an embodiment of this application.

FIG. 11 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Those skilled in the art can understand that the electronic device 100 may further include a power supply (for example, a battery) that supplies power to various components. The power supply may be logically connected to the processor 110 through a power management system, so that functions such as charge and discharge management and power consumption management are implemented by using the power management system. The structure of the electronic device shown in FIG. 11 does not constitute a limitation on the electronic device. The electronic device may include more or fewer components than shown in the figure, or some components may be combined, or there may be a different component layout. Details are not described herein again.

The radio frequency unit 101 is configured to: in a case that the electronic device is in idle state, transmit a target service list to a network-side device, where the target service list includes at least one QoS identifier, each QoS identifier is used to indicate QoS of one piece of application service data, and the application service data corresponding to the at least one QoS identifier is application service data that the electronic device does not expect to receive; where the at least one QoS identifier is used by the network-side device to process target application service data to be transmitted.

In the electronic device provided in this embodiment of this application, the network-side device can first determine whether the QoS identifier of the application service data is in the target service list when the network-side device needs to transmit the application service data, that is, determine whether the application service data is the data that the electronic device in the idle state needs to receive by paging. In this way, the network-side device determines whether to transmit the application service data based on the determining result instead of directly transmitting the application service data to the electronic device, avoiding transmitting a push message that the user is not interested in to the electronic device. This improves the flexibility of the network-side device in handling push messages, thereby improving the efficiency of message interception by electronic device.

Optionally, in this embodiment of this application, the radio frequency unit 101 is further configured to: after a target service list is transmitted to the network-side device, in a case that the target service list does not include the QoS identifier of the target application service data, receive the target application service data transmitted by the network-side device.

Optionally, in this embodiment of this application, the radio frequency unit 101 is further configured to: after the target service list is transmitted to the network-side device, establish a radio resource control RRC connection and receive a piece of first application service data transmitted by the network-side device. The first application service data is the application service data corresponding to the at least one QoS identifier, where the first application service data includes the target application service data or the first application service data does not include the target application service data.

Optionally, in an embodiment of this application, the processor 110 is configured to: after the target service list is transmitted to the network-side device, perform a paging process based on triggering from the network-side device to establish an RRC connection. The radio frequency unit 101 is further configured to receive the target application service data transmitted by the network-side device.

The electronic device provided in this embodiment of this application can implement the processes implemented in the foregoing method embodiment, and with the same technical effects achieved. To avoid repetition, details are not described herein again.

For the beneficial effects of the various implementations in this embodiment, reference may be made to the beneficial effects of the corresponding implementations in the foregoing method embodiment. To avoid repetition, details are not repeated herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function button (such as a volume control button or a power on or off button), a trackball, a mouse, and a joystick. Details are not described herein. The memory 109 may be configured to store software programs and various data which include but are not limited to an application program and an operating system. The processor 110 may integrate an application processor and a modem processor. The application processor mainly processes an operating system, a user interface, an application program, and the like. The modem processor mainly processes wireless communication. It can be understood that a modem processor may alternatively skip being integrated in the processor 110.

An embodiment of this application further provides a non-transitory readable storage medium, where a program or instructions are stored in the non-transitory readable storage medium. When the program or instructions are executed by a processor, the processes of the foregoing method embodiment are implemented, with the same technical effects achieved. To avoid repetition, details are not described herein again.

The processor is the processor in the electronic device in the foregoing embodiments. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor, and the processor is configured to run a program or instructions to implement the processes of the foregoing method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms “include” and “comprise”, or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing implementations. These implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A data processing method, performed by a network-side device, wherein the method comprises:

obtaining a target service list of a target electronic device from the target electronic device before the network-side device transmits target application service data, wherein the target service list comprises at least one quality of service (QOS) identifier, each QoS identifier is used to indicate QoS of one piece of application service data, and the application service data corresponding to the at least one QoS identifier is application service data that the target electronic device in an idle state does not expect to receive; and in a case of detecting that a QoS identifier report function is enabled by the target electronic device, processing the target application service data based on the target service list and the QoS identifier of a target application service data.

2. The method according to claim 1, wherein the method further comprises:

in a case that the target service list comprises the QoS identifier of the target application service data, caching or deleting the target application service data; or in a case that the target service list does not comprise the QoS identifier of the target application service data, transmitting the target application service data to the target electronic device.

3. The method according to claim 2, wherein after the caching or deleting the target application service data, the method further comprises:

in a case of detecting that the target electronic device has established a radio resource control (RRC) connection, transmitting a piece of first application service data to the target electronic device, the first application service data being the application service data corresponding to the at least one QoS identifier; wherein the first application service data comprises the target application service data, or the first application service data does not comprise the target application service data.

4. The method according to claim 2, wherein the transmitting the target application service data to the target electronic device comprises:

initiating a paging process to the target electronic device and in a case that the target electronic device has established a radio resource control (RRC) connection, transmitting the target application service data to the target electronic device.

5. A network-side device, comprising a processor, a memory, and a program or instructions stored in the memory and executable on the processor, wherein the program or instructions, when executed by the processor, cause the network-side device to perform:

obtaining a target service list of a target electronic device before the network-side device transmits target application service data, wherein the target service list comprises at least one quality of service (QOS) identifier, each QoS identifier is used to indicate QoS of one piece of application service data, and the application service data corresponding to the at least one QoS identifier is application service data that the target electronic device in an idle state does not expect to receive; and in a case of detecting that a QoS identifier report function is enabled by the target electronic device, processing the target application service data based on the target service list and the QoS identifier of a target application service data.

6. The network-side device according to claim 5, wherein the program or instructions, when executed by the processor, cause the network-side device to perform:

in a case that the target service list comprises the QOS identifier of the target application service data, caching or deleting the target application service data; or in a case that the target service list does not comprise the QoS identifier of the target application service data, transmitting the target application service data to the target electronic device.

7. The network-side device according to claim 6, wherein the program or instructions, when executed by the processor, cause the network-side device to further perform:

in a case of detecting that the target electronic device has established a radio resource control (RRC) connection, transmitting a piece of first application service data to the target electronic device, the first application service data being the application service data corresponding to the at least one QoS identifier; wherein the first application service data comprises the target application service data, or the first application service data does not comprise the target application service data.

8. The network-side device according to claim 6, wherein the program or instructions, when executed by the processor, cause the network-side device to perform:

initiating a paging process to the target electronic device and in a case that the target electronic device has established a radio resource control (RRC) connection, transmitting the target application service data to the target electronic device.

9. A non-transitory readable storage medium, where a program or instructions are stored in the non-transitory readable storage medium, and when the program or the instructions are executed by a processor, cause the network-side device to perform:

obtaining a target service list of a target electronic device before the network-side device transmits target application service data, wherein the target service list comprises at least one quality of service (QOS) identifier, each QoS identifier is used to indicate QoS of one piece of application service data, and the application service data corresponding to the at least one QoS identifier is application service data that the target electronic device in an idle state does not expect to receive; and in a case of detecting that a QoS identifier report function is enabled by the target electronic device, processing the target application service data based on the target service list and the QoS identifier of a target application service data.

10. The non-transitory readable storage medium according to claim 9, wherein the program or instructions, when executed by the processor, cause the network-side device to perform:

in a case that the target service list comprises the QoS identifier of the target application service data, caching or deleting the target application service data; or in a case that the target service list does not comprise the QoS identifier of the target application service data, transmitting the target application service data to the target electronic device.

11. The non-transitory readable storage medium according to claim 10, wherein the program or instructions, when executed by the processor, cause the network-side device to further perform:

in a case of detecting that the target electronic device has established a radio resource control (RRC) connection, transmitting a piece of first application service data to the target electronic device, the first application service data being the application service data corresponding to the at least one QoS identifier; wherein the first application service data comprises the target application service data, or the first application service data does not comprise the target application service data.

12. The non-transitory readable storage medium according to claim 10, wherein the program or instructions, when executed by the processor, cause the network-side device to perform:

initiating a paging process to the target electronic device and in a case that the target electronic device has established a radio resource control (RRC) connection, transmitting the target application service data to the target electronic device.

* * * * *